(12) United States Patent
Hartley et al.

(10) Patent No.: US 8,951,442 B2
(45) Date of Patent: *Feb. 10, 2015

(54) ANTICORROSIVE COMPOSITION

(71) Applicant: Sears Petroleum & Transport Corporation and Sears Ecological Applications Co., LLC, Rome, NY (US)

(72) Inventors: Robert A. Hartley, Ontario (CA); David H. Wood, Rome, NY (US)

(73) Assignee: Sears Petroleum & Transport Corporation and Sears Ecological Applications Co., Rome, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,710

(22) Filed: Feb. 10, 2014

(65) Prior Publication Data

US 2014/0155304 A1    Jun. 5, 2014

Related U.S. Application Data

(63) Continuation of application No. 13/487,915, filed on Jun. 4, 2012, now Pat. No. 8,647,532, which is a continuation of application No. 12/480,986, filed on Jun. 9, 2009, now abandoned.

(60) Provisional application No. 61/059,981, filed on Jun. 9, 2008.

(51) Int. Cl.

| | |
|---|---|
| C23F 11/00 | (2006.01) |
| C09K 3/00 | (2006.01) |
| C09K 3/18 | (2006.01) |
| C04B 9/02 | (2006.01) |
| B05C 1/16 | (2006.01) |
| B05D 5/10 | (2006.01) |
| E01C 5/00 | (2006.01) |
| E01C 11/24 | (2006.01) |
| E01C 17/00 | (2006.01) |
| C09D 5/08 | (2006.01) |
| C09K 8/54 | (2006.01) |
| C09K 15/34 | (2006.01) |

(52) U.S. Cl.
CPC ............... *C09D 5/086* (2013.01); *C09K 3/185* (2013.01); *C09K 8/54* (2013.01); *C09K 15/34* (2013.01)
USPC ............. 252/396; 252/70; 252/387; 252/388; 106/13; 106/14.05; 106/14.11; 106/14.34; 106/14.44; 427/136

(58) Field of Classification Search
USPC ........... 252/70, 387, 388, 396; 106/13, 14.05, 106/14.44, 14.34; 427/136
See application file for complete search history.

(56) References Cited

U.S. PATENT DOCUMENTS

| | | | | |
|---|---|---|---|---|
| 2,785,127 | A * | 3/1957 | Shock et al. ................... | 507/209 |
| 5,369,122 | A * | 11/1994 | Steinmetzer .................. | 514/423 |
| 6,416,684 | B1 * | 7/2002 | Bloomer ......................... | 252/70 |
| 6,596,188 | B1 * | 7/2003 | Hartley et al. .................. | 252/70 |
| 6,613,559 | B2 * | 9/2003 | Raghukumar et al. ..... | 435/262.5 |
| 6,641,753 | B1 * | 11/2003 | Bloomer ......................... | 252/70 |
| 6,905,631 | B2 * | 6/2005 | Hartley et al. .................. | 252/70 |

OTHER PUBLICATIONS

Obretenov et al. Melanoidins in the Maillard Reaction. Developments in Food Science. vol. 40, 1998, pp. 455-482.*
Yoshimura et al. Antioxidative Effect of Maillard Reaction Products Using Glucose Glycine Model System. J. Agric. Food Chem, 1997, 45, 4106-4109.*

* cited by examiner

*Primary Examiner* — Harold Pyon
*Assistant Examiner* — Tanisha Diggs
(74) *Attorney, Agent, or Firm* — Hiscock & Barclay, LLP (57) ABSTRACT

The present invention relates to the discovery that melanoidins, and higher molecular weight fractions of products containing melanoidins, provide significant corrosive inhibition, which render these melanoidins suitable for use as anticorrosive agents in corrosive environments. In addition to being highly anticorrosive, the melanoidins of the present invention are environmentally friendly and non-toxic, and can be found in animal food and in human foodstuffs.

17 Claims, 7 Drawing Sheets

ANTICORROSIVE COMPOSITION

CROSS-REFERENCE TO RELATED APPLICATIONS

This application is a continuation of U.S. Ser. No. 13/487,915, entitled Anticorrosive Composition, filed Jun. 4, 2012, now U.S. Pat. No. 8,647,532, which is a continuation of U.S. Ser. No. 12/480,986, entitled Anticorrosive Composition, filed Jun. 9, 2009, now abandoned, which claims priority from U.S. Provisional Patent Application Ser. No. 61/059,981, filed Jun. 9, 2008. The entirety of all applications is incorporated hereby reference.

FIELD OF THE INVENTION

This invention relates in general to corrosion caused by exposure to a corrosive environment and, more specifically, to the use of an anticorrosive agent that has a wide range of applicability in reducing corrosion.

BACKGROUND OF THE INVENTION

Corrosion problems caused by exposure to and/or the use of chloride salt has been a longstanding problem in many applications and industries, including deicing and anti-icing for roadways and bridges (often causing rebar corrosion), oil well drilling operations, and other industrial and marine applications carried out in corrosive environments. One common industrial application of chloride salts are their use in industrial brines. A brine can be an aqueous solution of chloride salts alone, or in combination with sodium, potassium, calcium and magnesium cations.

One approach to address corrosion has been the addition of various anticorrosive agents to the chloride salts or brines in order to reduce the corrosive effect. These various additives can be expensive. To a large extent, these additives have been ineffective in controlling the corrosivity of the brines. Similarly, the use of deicing formulations, which commonly include a chloride salt, inherently have a corrosive effect upon roadways, bridges (including rebar corrosion) and the environment. Various anticorrosive additives have been used with these formulations with mixed success.

The prior art recognizes that the presence of carbohydrates such as corn syrup and molasses, often used in deicing applications, reduces or inhibits corrosion at some level. However, when corrosion is an issue that must be addressed, a separate corrosion inhibitor component is usually added to the carbohydrates. The main reason for this approach is that excessive amounts of the carbohydrate would be required in order to obtain a significant anticorrosive effect due to the relatively small amount of anticorrosive moiety contained in a given carbohydrate. In these cases, specific anticorrosive agents are selected and/or synthesized to be effective in very small concentrations (very often less than 1%) so as not to affect the essential characteristics of the carbohydrate, such as freezing point, viscosity and cost. In fact, excessive concentrations of carbohydrate to accomplish a significant reduction in corrosion could well render the carbohydrate unsuitable for its intended use (e.g., as an effective deicer).

It can be seen from above that there has been a longstanding need for a solution to these corrosion problems, including the effect on the environment.

BRIEF DESCRIPTION OF THE INVENTION

The present invention relates to the discovery that melanoidins, and higher molecular weight fractions of products containing melanoidins, provide significant corrosive inhibition, which render these melanoidins suitable for use as anticorrosive agents in corrosive environments. In addition to being highly anticorrosive, the melanoidins of the present invention are environmentally friendly and non-toxic, and can be found in animal food and in human foodstuffs. There are a number of applications and industries where corrosion is a problem that these additives can be used (e.g., additives to industrial brines, deicing formulations for roadways and bridges, oil well drilling, and in other industrial and marine applications where corrosion is a problem).

DETAILED DESCRIPTION OF THE INVENTION

The present invention relates to the discovery that melanoidins, and higher molecular weight fractions of products containing melanoidins, provide significant corrosive inhibition, which render these melanoidins suitable for use as anticorrosive agents in corrosive environments.

Melanoidins are brown-colored polymers formed by the interaction of amino acids and carbohydrates (e.g., mono-, di-, and oligosaccharides). Melanoidins are formed by a reaction between carbohydrates/saccharides and amino acids during aqueous processing at elevated temperatures (e.g., 70 to 120° C.). This is known as the Maillard Reaction which is a complex reaction with a network of consecutive and parallel chemical reactions.

Although the molecular weights of melanoidins can vary from about 400 to more than 100,000 depending upon reaction conditions (e.g., temperature, time, pH, water content), the molecular weight of the melanoidins suitable for use in the present invention is above about 10,000, with a preferred range being about 12,400 and higher (i.e., higher molecular weight melanoidins).

Melanoidins contain groups (e.g., amino, carboxyl) which can chelate ferrous ions. In the corrosion cell, ferrous ions are produced at the steel anode. Inhibition of the corrosion process at the anode occurs when chelation/complexation of the ferrous ions occur. It has been shown that the type of saccharide is a significant factor in the chelation reaction. For example, glucose is more efficient than the disaccharide lactose in iron binding ability. It has also been shown that glucose/glutamic acid readily complexes with several cations e.g. $Mg^{2+}$, $Cu^{2+}$, $Ca^{2+}$ and $Zn^{2+}$. Therefore anodic inhibition will occur.

The cathode in the corrosion cell requires the presence of oxygen for corrosion to occur. Removing oxygen causes cathodic inhibition. Melanoidins from the Maillard Reaction have been shown to have anti-oxidative properties. Researchers have examined a glucose/glycine model and found anti-oxidation effects. Others have used the glucose/glycine model and found that the high molecular weight fraction, with a molecular weight greater than 12,400 was significantly more effective than other fractions. Still others have examined Maillard Reaction products from lactose/lysine model systems and concluded that high molecular weight fractions were more colored and had the highest anti-oxidative activity. Therefore cathodic inhibition will occur.

Molasses derived from sugar cane was selected as the exemplary source for obtaining the higher molecular weight melanoidins of the description of the present invention. Melanoidins are present in molasses, which is a product of the manufacture and/or refining of sucrose from mainly sugar cane or sugar beets, although molasses can be obtained from the processing of citrus fruit, starch (from corn or grain sorghum) which is hydrolyzed by enzymes and/or acid, also from hemicellulose extract which is a product of the manufacture of pressed wood. However, the scope of the present invention is not limited to a particular source of melanoidins, which may be derived from various agricultural sources (e.g., corn, wheat, barley, rice, sugar beets. and sugar cane, which after processing, yield other products), corn steep liquor (CSL), brewers condensed solubles (BCS), and distillers condensed solubles (DCS). In addition, other products having similar molecular weight (GPC) profiles to these known examples with respect to higher molecular weight components and fractions would also provide melanoidins suitable for corrosion inhibition.

It is known that a mix (e.g., 80/20) of salt brine and molasses (e.g., 79.5 Brix Molasses) provides significantly more corrosion inhibition as compared to the corrosion caused by the salt brine alone. In order to identify the components in the molasses that contribute to the anticorrosive effect of the product, chromatographic separation (e.g., column chromatography, gel permeation chromatography) can be used to separate the components of a mixture by size, with the results shown on a chromatogram profile.

For example, in some of the experiments described herein, chromatogram profiles were obtained on various diluted samples using gel permeation chromatography (GPC) under the following chromatography conditions: Column (Bio-S-3000), Mobile Phase (Sodium Azide 0.05%), Detector (Refractive Index), Flow Rate (1.0 mL/min), Injection Volume (10.0 µL), and Run Time (20 minutes).

FIGS. 1 through 7 show GPC profiles for various samples. Each profile shows peaks for the molecular weights of components present in the sample. Peaks do not necessarily represent a single compound, but, particularly at higher molecular weight ranges, may be comprised of multiple components or polymers having heterogeneous composition. Each profile also provides the elapsed time before a particular molecular weight component was released from the column (retention time (RT)). As general rule, the higher the molecular weight of the component, the shorter the retention time. Likewise, the lower the molecular weight of the component, the longer the retention time. Each profile also provides the height and area of the peak representing a particular molecular weight component, which allows for the determination of the weight percent of that particular molecular weight in the sample.

Figure 1:
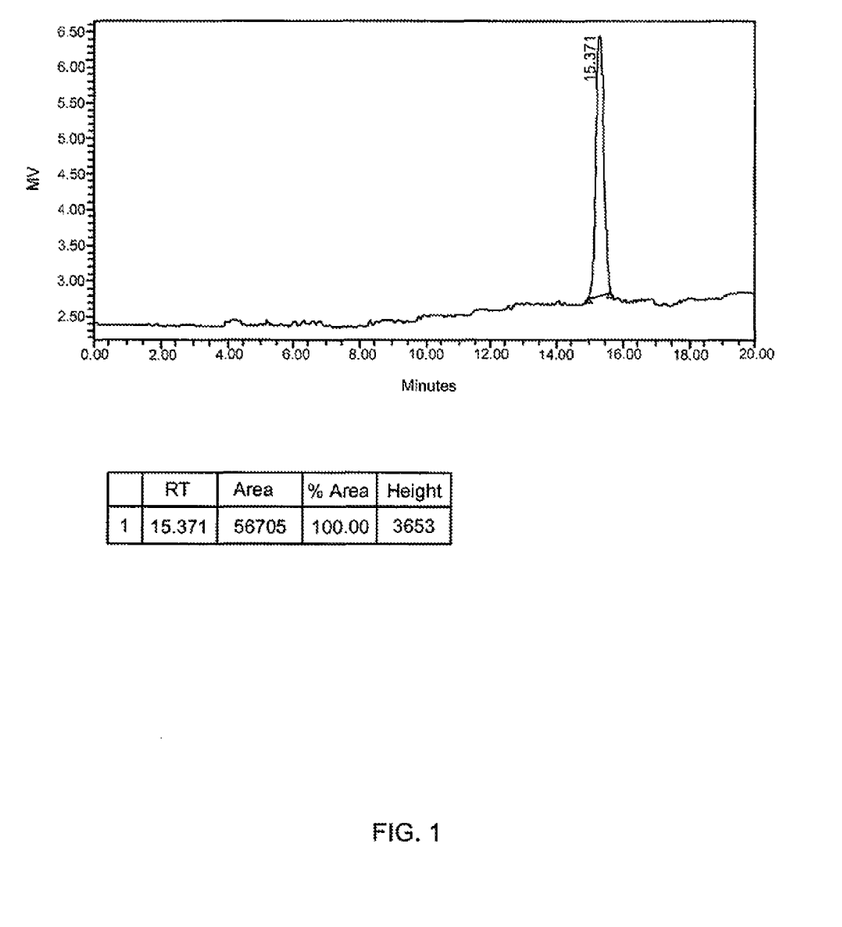
FIG. 1 illustrates a GPC profile for sucrose.
Figure 2:
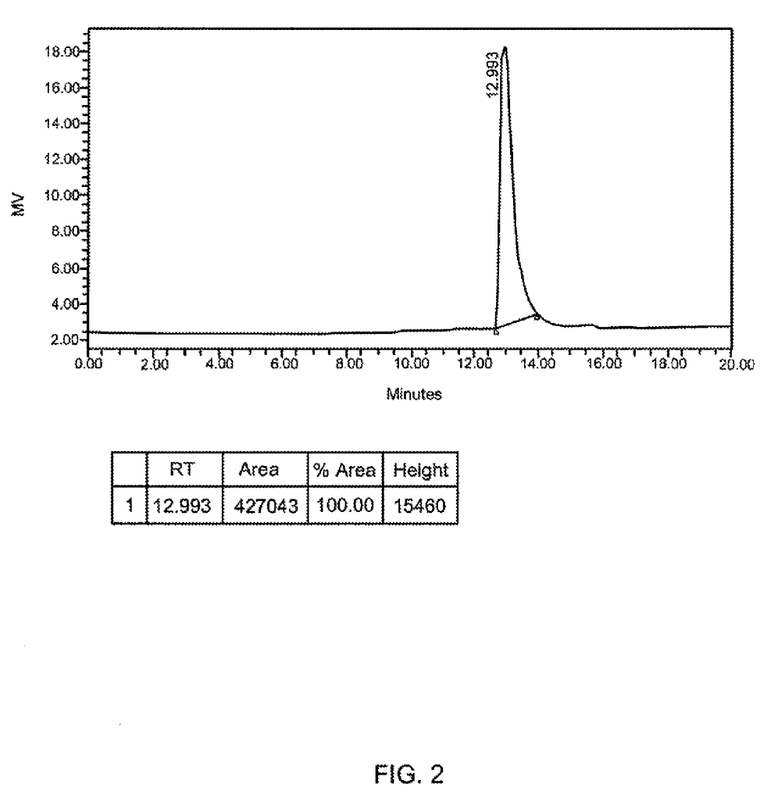
FIG. 2 illustrates a GPC profile for a component having a molecular weight of 12,400.

For example, FIG. 1 illustrates a GPC profile for sucrose (MW=342) having a retention time under those particular test conditions of 15.371 minutes. Similarly, FIG. 2 illustrates a GPC profile for a component having a molecular weight of 12,400 having a retention time under those same test conditions of 12.993 minutes. Accordingly, based on those standards and under those same test conditions, for components with molecular weights less than 342, one would expect retention times longer than 15.371 minutes. Similarly, for components with molecular weights greater than 12,400, one would expect retention times shorter than 12.993 minutes.

Figure 3:
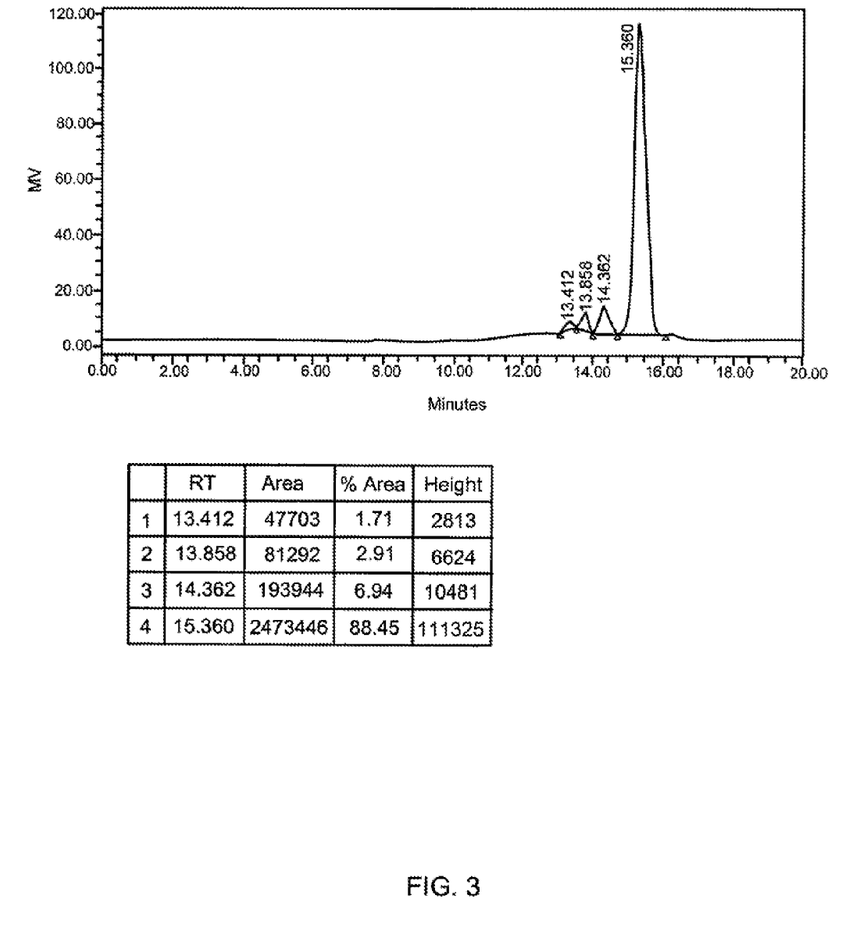
FIG. 3 illustrates a GPC profile for 79.5 Brix Molasses.

FIG. 3 illustrates a GPC profile for 79.5 Brix Molasses, which shows a retention time of 15.360 minutes for the most significant peak (i.e., the largest concentration has a molecular weight that corresponds to a retention time of 15.360 minutes). Comparing this GPC profile for the molasses (FIG. 3) to the GPC profile for sucrose (MW=342) (FIG. 1) and the GPC profile for a molecular weight standard of 12,400 (FIG. 2), one can see that there is a significant concentration of sucrose in the molasses and other lower molecular weight components in the molasses (i.e., that would have retention times near 15.371 minutes for sucrose). There is also a very low concentration of higher molecular weight components (i.e., that would have retention times near or less than 12.993 minutes for a MW=12,400).

Turning to the experiments used to identify the components in the molasses that contribute to the anticorrosive effect of the product, in one experiment, 79.5 Brix Molasses (200 g/150 mL) was diluted (1:1) with distilled water (200 g/200 mL) and then separated into five fractions (A-E) by adding increasing amounts of denatured alcohol (85% ethanol/15% methanol) employing an alcohol precipitation method by sequential addition. Alcohol precipitation is one method of selective precipitation widely used for isolating higher molecular weight fractions from heterogeneous mixtures. In alcohol precipitation, denatured alcohol is used as the non-solvent in a step-wise manner, filtering off the precipitate between each addition.

Fraction A was a precipitate with the least amount of the alcohol mixture and contained the highest molecular weight components, while fraction E had the greatest amount of the alcohol mixture and was the lowest molecular weight fraction of the molasses. These precipitates could be filtered and dried.

Figure 4:
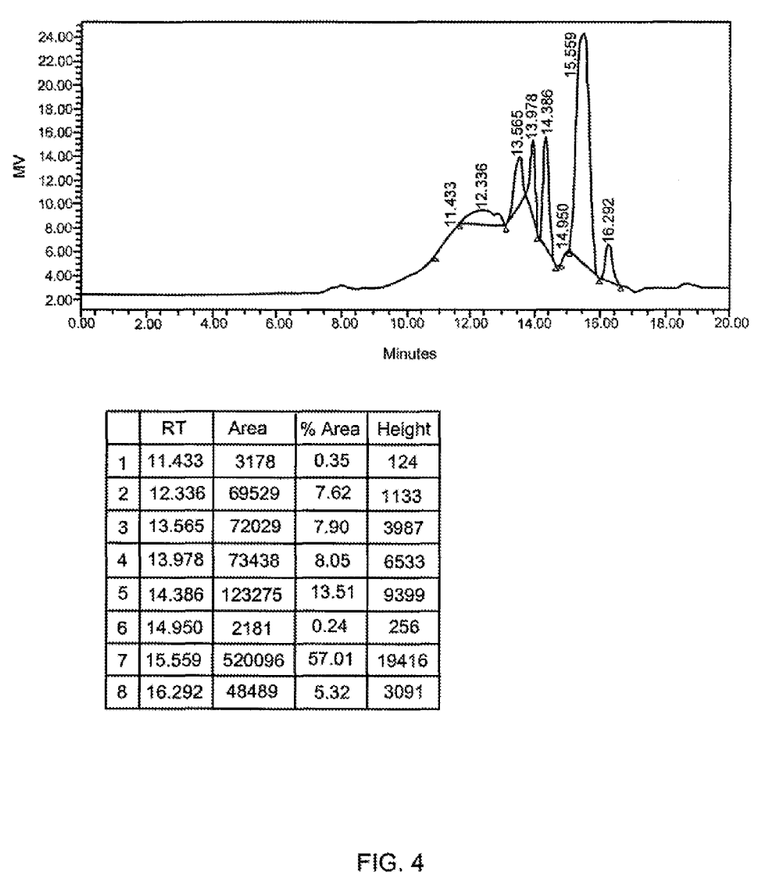
FIG. 4 illustrates a GPC profile for Fraction A obtained from the alcohol precipitation of the molasses.

FIG. 4 illustrates a GPC profile for Fraction A with eight peaks, showing the inclusion of higher molecular weight components with retention times near or shorter than the retention time for MW=12,400 (RT=12.993 minutes), but still having a significant amount of lower molecular weight components with retention times near or longer than the retention time for sucrose (MW=342) (RT=15.371 minutes).

A 100 ml sample of each fraction (A-E) was then mixed with 400 ml of 30% NaCl to yield an 80/20 mix for corrosion rate testing according to the NACE Standard TM-01-69 Method as modified by the Pacific Northwest Snowfighters (PNS).

Corrosion rate testing showed that certain fractions include corrosion inhibiting components, with fractions A (55.5% reduction), B (29.4% reduction), and E (63.2% reduction) all reducing the corrosiveness of the magnesium chloride when used alone.

Organic acid analysis of the molasses and these fractions demonstrated that trans-aconitic acid, which comes from sugar cane, is present in the molasses (1.63%), and more specifically, Fraction A (0.88%) and fraction B (0.23%), but is absent from fraction E. Aconitic acid is a compound found in sugar processing and is the main organic acid in sugar juice and in raw sugar. Aconitic acid is bound or associated with polysaccharides with a molecular weight of 300,000.

Protein analysis of the molasses and these fractions demonstrated that protein is present in molasses (5.2%), and more specifically, Fraction A (1.9%) and fraction E (1.6%).

Amino acid analysis of the molasses and these fractions demonstrated that amino acids are present in the molasses (0.37%), and more specifically, in trace concentrations in Fraction A and fraction E, with aspartic acid having the most significant concentration (0.25%).

Carbohydrate analysis of these fractions demonstrated that the concentration of carbohydrates present (after dilution) in fraction E (5.25%) are sufficient to account for the bulk of the corrosion inhibition shown by that fraction, but the low concentrations of carbohydrates present in fractions A (0.78%) and B (0.40%) are not sufficient to account for corrosion inhibition shown by those fractions.

Corrosion rate testing on the molasses and selected carbohydrates present in the molasses demonstrated that the corrosion inhibition of the molasses is greater than that of its constituent carbohydrates alone. Furthermore, corrosion rate testing demonstrated that higher molecular weight (HMW) Fraction A, which contains 25% of the total solids in the molasses, exhibits similar corrosion inhibition to lower molecular weight (LMW) fraction E, which contains 60% of the total solids in the molasses.

Given that data, it was shown that, on a weight basis, the higher molecular weight components in Fraction A have approximately twice the corrosion inhibition activity of the lower molecular weight carbohydrates in fraction E. This suggested the presence of higher molecular weight components in Fraction A other than carbohydrates are largely responsible for the corrosion inhibition demonstrated by that fraction. These higher molecular weight components are melanoidins.

These various analyses also indicated that approximately 23% of the total solids in the molasses are not organic acids, proteins, amino acids, or carbohydrates, with a significant amount of those unidentified solids (3.5%) present in fractions A and E, which show corrosion inhibition.

To further identify the higher molecular weight components in the molasses and Fraction A (prepared using alcohol precipitation) that are largely responsible for corrosion inhibition, various techniques can be used, including selective precipitation, dialysis, ultrafiltration, or a combination of those techniques.

In another experiment, the 79.5 Brix molasses was subjected to dialysis at room temperature using a regenerated thin semi-permeable cellulose (RC) Spectrum Laboratories membrane with a defined molecular weight cut-off of 12,400. The membrane allows the components having molecular weights below the cut-off to pass through or permeate the membrane ("permeate"), leaving behind the components having molecular weights above the cut-off (and lower molecular weight components closely associated with them) that are stopped or retained by the membrane ("retentate").

In the experiment, 3 g of the molasses was dissolved in 30 mL of distilled water contained in the cellulose membrane, which was then placed in a 2 L beaker containing 500 mL of distilled water. A magnetic stirrer agitated the contents of the beaker. After at least 24 hours of dialysis, the membrane package containing the brown higher molecular weight fraction (retentate) was removed from the yellow lower molecular weight fraction (permeate). The brown retentate was then dissolved in 500 mL of distilled water.

The brown higher molecular weight fraction (retentate) contained the higher molecular weight components with molecular weights greater than the cellulose membrane cut-off (12,400) as well as lower molecular weight components that are closely associated with the higher molecular weight components stopped or retained by the membrane. The brown color and molecular weight data indicates the presence of melanoidins in the higher molecular weight fraction (retentate).

The yellow lower molecular weight fraction (permeate) contained the lower molecular weight components with molecular weights less than the membrane cut-off (12,400) that passed through or permeated the membrane. The yellow color and molecular weight data tends to indicate the absence or limited presence of melanoidins in the lower molecular weight fraction (permeate).

After the dialysis of the molasses, both the resulting higher molecular weight fraction (retentate) and the lower molecular weight fraction (permeate) contained the relative amounts of components that would be present in a solution of 0.6% molasses (3 g molasses/500 mL distilled water).

Separate corrosion rate testing was performed on solutions of sodium chloride (3%) combined with molasses, the higher molecular weight fraction (retentate), and the lower molecular weight fraction (permeate) using a method based on the PNS test, modified to increase the speed required to perform the test.

The results of the corrosion rate testing are shown in Table 1.

TABLE 1

| Chloride Solution | Corrosion Inhibitor (Weight % & mg/mL) | Steel Metal Loss (mg) | Corrosion Reduction (%) |
|---|---|---|---|
| 3% NaCl (3,000 mg/100 mL) | None | 49.4 | None |
| 3% NaCl (3,000 mg/100 mL) | 0.6% Molasses (424.2 mg/100 mL) | 20.40 | 62.3 |
| 3% NaCl (3,000 mg/100 mL) | 0.6% HMW retentate (63.0 mg/100 mL) | 13.04 | 75.9 |
| 3% NaCl (3,000 mg/100 mL) | 0.6% LMW permeate (not recorded) | 23.92 | 55.8 |

The percent reduction in corrosion for a particular solution is calculated by taking the difference between steel metal loss for that solution and the steel metal loss for the chloride salt solution and dividing that difference by the steel metal loss for the chloride salt solution, and multiplying that ratio by 100.

$$\% \, CR = \frac{w_1 - w_2}{w_1} \times 100$$

where
$w_1$=weight loss of uninhibited chloride solution
$w_2$=weight loss of inhibited chloride solution These results demonstrate that the higher molecular weight fraction (retentate) is a far more potent corrosion inhibitor than the molasses or the lower molecular weight fraction (permeate), despite the fact that the solids content of the retentate (63.0 mg/100 mL) is significantly less than the solids content of the molasses (424.2 mg/100 mL) and the permeate (not recorded but approximately 360 mg/100 mL). For example, even though the higher molecular weight fraction (retentate) has almost seven times less solids content than the molasses (i.e., only represents approximately 15% of the dry weight molasses or 10% of the liquid molasses), it provides a much greater reduction in corrosion. The melanoidins present in the higher molecular weight fraction (retentate) inhibit corrosion by both anodic and cathodic inhibition.

Separate corrosion rate testing was performed on solutions of sodium chloride (3%), magnesium chloride (3%), and calcium chloride (3%) combined with the higher molecular weight fraction (retentate) using the modified PNS test. Triplicate 10 mL samples were evaporated to dryness in an oven for one hour at 105° C., cooled in desiccators for thirty minutes and weighed. The cycle of drying, cooling, and desiccating, and weighing was continued until a constant weight (in mg/100 mL) was obtained.

The results of the corrosion rate testing are shown in Table 2.

TABLE 2

| Chloride Solution | Corrosion Inhibitor (Weight % & mg/mL) | Steel Metal Loss (mg) | Corrosion Reduction (%) |
|---|---|---|---|
| 3% NaCl (3,000 mg/100 mL) | None | 49.4 | None |
| 3% NaCl (3,000 mg/100 mL) | 0.3% HMW retentate (25.6 mg/100 mL) | 20.0 | 59.5 |
| 3% NaCl (3,000 mg/100 mL) | 0.6% HMW retentate (57.8 mg/100 mL) | 17.6 | 64.4 |
| 3% NaCl (3,000 mg/100 mL) | 1.0% HMW retentate (105.9 mg/100 mL) | 12.0 | 75.7 |
| 3% $MgCl_2$ (3,000 mg/100 mL) | None | 17.27 | None |
| 3% $MgCl_2$ (3,000 mg/100 mL) | 0.6% HMW retentate (65 mg/100 mL) | 7.06 | 59.1 |
| 3% $CaCl_2$ (3,000 mg/100 mL) | None | 38.10 | None |
| 3% $CaCl_2$ (3,000 mg/100 mL) | 0.6% HMW retentate (62.2 mg/100 mL) | 6.54 | 82.8 |

These results demonstrate that as the concentration of the higher molecular weight fraction (retentate) is increased, the corrosive inhibition also increases. Similar results when combined with other chloride salts (e.g., potassium chloride) would be expected. The melanoidins present in the higher molecular weight fraction (retentate) inhibit corrosion by both anodic and cathodic inhibition.

In another experiment, Fraction A of the 79.5 Brix Molasses was obtained using the alcohol precipitation method described above. Recall that FIG. 4 illustrates a GPC profile for Fraction A, showing the inclusion of higher molecular weight components with retention times near or shorter than the retention time for MW=12,400 (RT=12.993 minutes), but still having a significant amount of lower molecular weight components with retention times near or longer than the retention time for sucrose (MW=342) (RT=15.371 minutes). Fraction A was then subjected to the same dialysis process described above for the molasses using a cellulose membrane with a defined molecular weight cut-off of 12,400.

Figure 5:
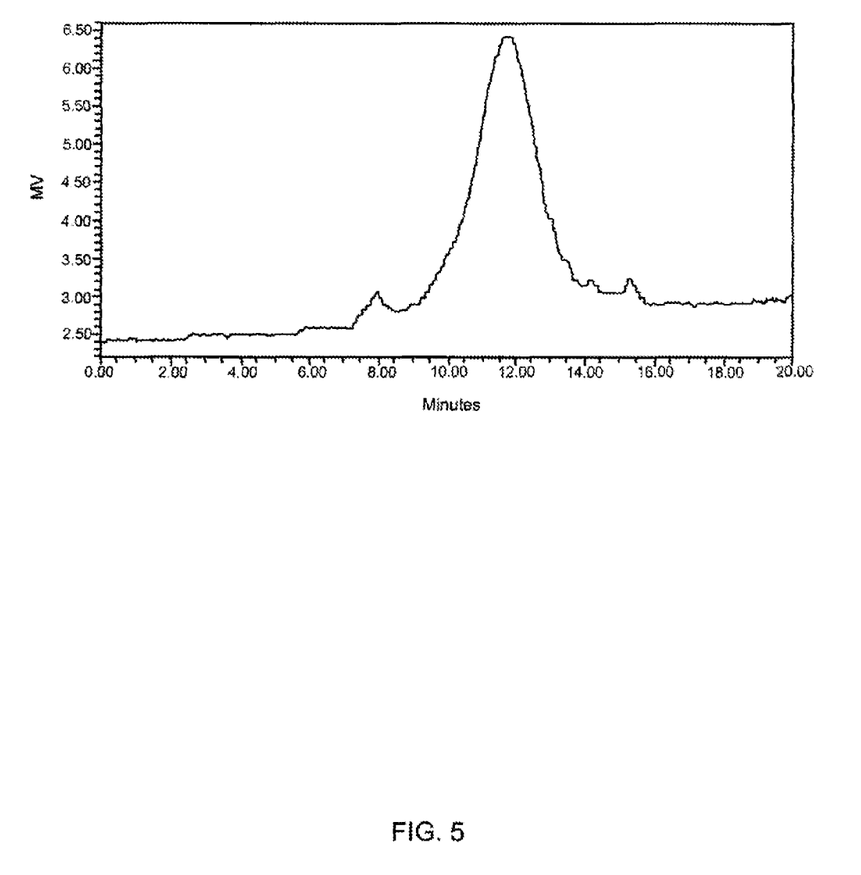
FIG. 5 illustrates a GPC profile for the higher molecular weight fraction (retentate) obtained from the dialysis of Fraction A.

After dialysis, the higher molecular weight fraction (retentate) of Fraction A had a brown color (similar to but less intense than the color of Fraction A) and contained the higher molecular weight components with molecular weights greater than the cellulose membrane cut-off (12,400) as well as lower molecular weight components that are closely associated with the higher molecular weight components stopped or retained by the membrane. FIG. 5 illustrates a GPC profile for the higher molecular weight fraction (retentate) of Fraction A, indicating a major unimodal peak at a retention time of approximately 12 minutes, which is near and shorter than the retention time for MW=12,400 (RT=12.993 minutes). This illustrates the increased concentration of higher molecular weight components in the higher molecular weight fraction (retentate) of Fraction A (FIG. 5) as compared to Fraction A (FIG. 4). The brown color and molecular weight data indicates the presence of melanoidins in the higher molecular weight fraction (retentate) of Fraction A.

Figure 6:
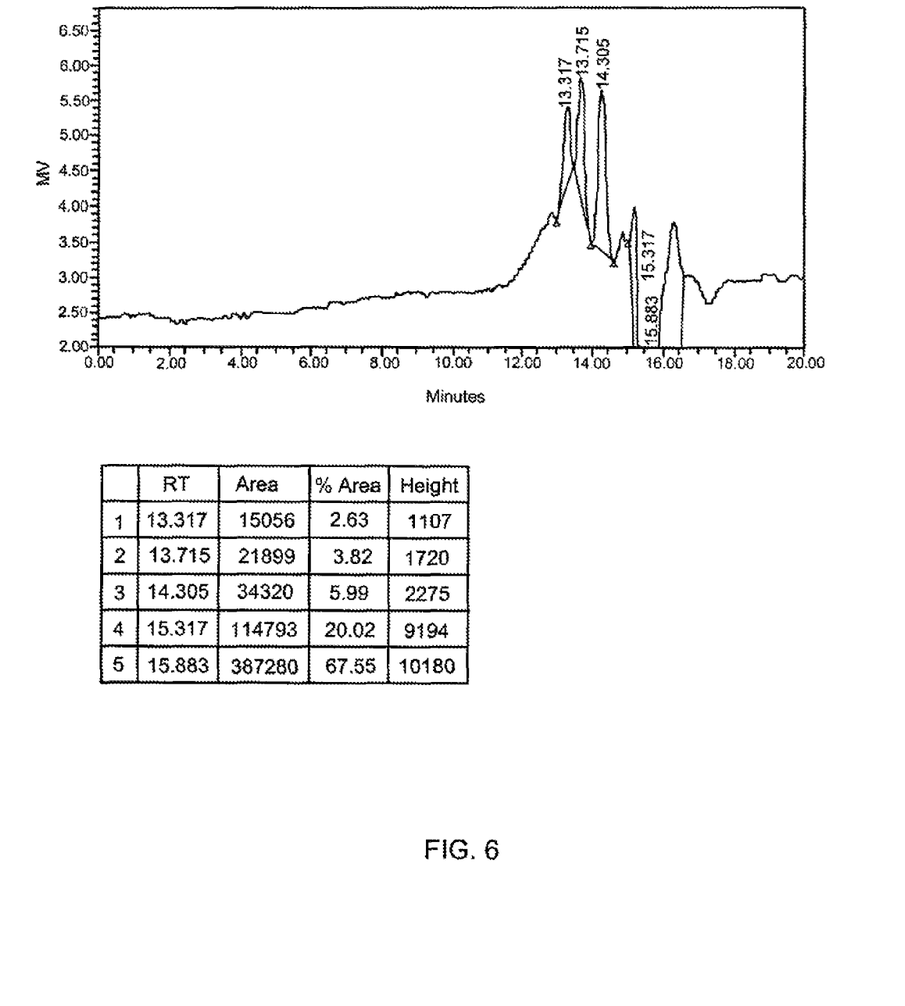
FIG. 6 illustrates a GPC profile for the lower molecular weight fraction (permeate) obtained from the dialysis of Fraction A.

The lower molecular weight fraction (permeate) of Fraction A had a bright yellow color and contained the lower molecular weight components with molecular weights less than the membrane cut-off (12,400) that passed through or permeated the membrane. FIG. 6 illustrates a GPC profile for the lower molecular weight fraction (permeate) of Fraction A, showing five peaks, all with retention times longer than the retention time for MW=12,400 (RT=12.993 minutes). This illustrates the theoretical absence of all higher molecular weight components in the lower molecular weight fraction (permeate) of Fraction A that were stopped or retained by the cellulose membrane. The yellow color and molecular weight data tends to indicate the absence or limited presence of melanoidins in the lower molecular weight fraction (permeate) of Fraction A.

Molasses Fraction A was subjected to hydrolysis using 2 M trifluoroacetic acid heated at 120° C. for 2 hours. No increase in carbohydrate peaks was observed. The acid caused a precipitate to form related to the HMW material. The addition of sodium hydroxide to neutralize the acid caused the HMW material to dissolve and again be detected by GPC.

In another experiment, ultrafiltration was used to identify the higher molecular weight components in the 79.5 Brix Molasses that are largely responsible for corrosion inhibition. Ultrafiltration is a pressure-driven process where a fluid stream is pumped at low pressure and high flow rate across the surface of thin semi-permeable polymeric membranes with a defined molecular weight cutoff. As with dialysis previously described, ultrafiltration uses a membrane having a defined molecular weight cut-off that allows components having molecular weights below the cut-off to pass through or permeate the membrane ("permeate"), leaving behind the components having molecular weights above the cut-off (and lower molecular weight components closely associated with them) that are stopped or retained by the membrane ("retentate"). The ultrafiltration equipment used for the experiment was Quix Stand UltraFiltration System (Amersham Biosciences, GE Healthcare) with a Hollow Fiber Cartridge UFP-10-E-3 MA with a nominal molecular weight cut-off of 10,000 and surface area of 110 $cm^2$.

In the experiment, 10 g of molasses was added to 800 mL of distilled water, mixed, and added to the feed reservoir of the ultrafiltration system to obtain a higher molecular weight fraction (retentate) with components having molecular weights above 10,000 and a lower molecular weight fraction (permeate) with components having molecular weights below 10,000. GPC profiles were then obtained using a High Pressure Liquid Chromatograph (HPLC) with a Waters 410 Differential Refractometer under the same chromatography conditions as previously described.

The reference retention times determined for comparison to some of the later-obtained test results are shown in Table 3.

TABLE 3

| Molecular Weight | Retention Time (minutes) |
|---|---|
| 342 (Sucrose) | 11.38 |
| 1,400 | 10.61 |
| 6,900 | 9.49 |
| 12,400 | 8.93 |
| 20,100 | 8.41 |

Figure 7:
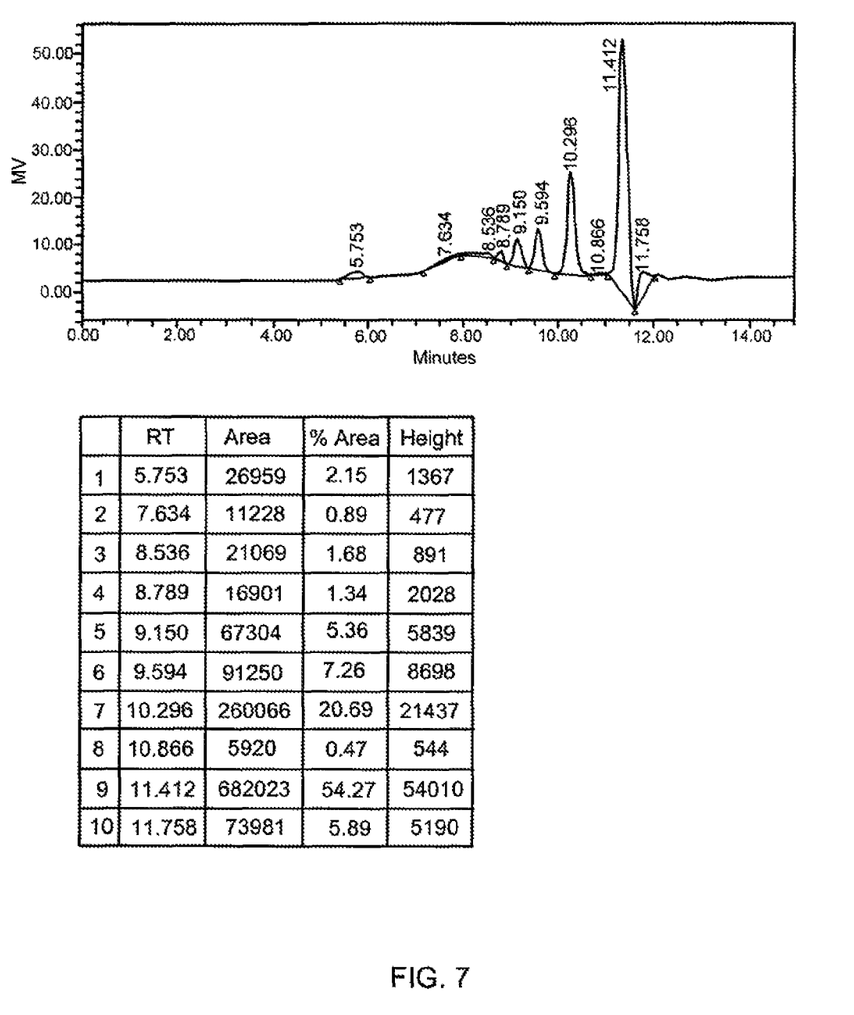
FIG. 7 illustrates a GPC profile for the higher molecular weight fraction (retentate) obtained from the ultrafiltration of the molasses.

FIG. 7 illustrates a GPC profile for the higher molecular weight fraction (retentate) obtained from the ultrafiltration of the molasses. The GPC profile for the higher molecular weight fraction (retentate) shows a total of ten peaks.

The retention times, weight percents, and molecular weights for each of the peaks are shown in Table 4.

TABLE 4

| Time Minutes | % Area Under Curve | Molecular Weight |
|---|---|---|
| 5.753 | 2.15 | Greater than 100,000 |
| 7.634 | 0.89 | 40,000 |
| 8.536 | 1.68 | 18,500 |
| 8.789 | 1.34 | 14,000 |
| 9.150 | 5.36 | 10,000 |
| 9.594 | 7.28 | 7000 |
| 10.296 | 20.69 | 2700 |
| 10.866 | 0.47 | 990 |
| 11.412 | 54.27 | 342 |
| 11.768 | 5.89 | 180 |

Based on the retention time for the standard MW=12,400 (RT=8.93), the GPC profile shows that higher molecular weight components with molecular weights greater than 12,400 make up approximately 6% by weight of the higher molecular weight fraction (retentate), while higher molecular weight components with molecular weights greater than or equal to 10,000 make up approximately 10% of the retentate. Based on the results of the earlier experiments demonstrating that the higher molecular weight fractions (retentate) exhibited superior corrosion inhibition over molasses, additional corrosion rate testing was performed using the retentate from the ultrafiltration process to confirm these earlier results.

The results of the corrosion rate testing are shown in Table 5.

TABLE 5

| Chloride Solution | Corrosion Inhibitor | Corrosion Inhibitor (mg/100 mL) | Steel Metal Loss (mg) | Corrosion Reduction (%) |
|---|---|---|---|---|
| 3% NaCl (3,000 mg/100 mL) | None | None | 74.81 | None |
| 3% NaCl (3,000 mg/100 mL) | Molasses (904.5 mg/100 mL) | 8,870 | 43.65 | 41.65 |
| 3% NaCl (3,000 mg/100 mL) | Molasses (219.2 mg/100 mL) | 2,150 | 46.15 | 38.31 |
| 3% NaCl (3,000 mg/100 mL) | HMW retentate (248.8 mg/100 mL) | 2,440 | 26.90 | 64.04 |
| 3% MgCl$_2$ (3,000 mg/100 mL) | HMW retentate (59.7 mg/100 mL) | 585 | 39.36 | 47.39 |

These results once again demonstrate the superior corrosive inhibition of the higher molecular weight fraction (retentate) as compared to the molasses. For example, although the concentration of molasses (904.5 mg/100 mL) on a weight basis is approximately fifteen times greater than the concentration of the higher molecular weight fraction (retentate) (59.7 mg/100 mL) in one example, the retentate resulted in approximately 6% greater corrosion reduction (a relative improvement of approximately 14%).

Based on that data, on a weight basis, the higher molecular weight fraction (retentate) is approximately 17 times more efficient as a corrosion inhibitor than molasses (i.e., 14% improvement on top of a weight difference of 15 times). The previously described experiments have shown that it is the higher molecular weight components in the retentate of the molasses (i.e., those components with molecular weights greater than 10,000 or 12,400) that provide the greatest and most unexpected corrosion inhibition. Those components only constitute 6% to 10% of the weight of the retentate. Given this data, those higher molecular weight components are approximately 170 to 280 times more efficient as a corrosion inhibitor than molasses on a weight basis. The melanoidins present in the higher molecular weight fraction (retentate) inhibit corrosion by both anodic and cathodic inhibition.

There are a number of applications and industries where corrosion is a problem that additives including melanoidins (or higher molecular weight fractions of melanoidin-containing products) can be used (e.g., additives to industrial brines, deicing formulations for roadways and bridges, oil well drilling, and in other industrial and marine applications where corrosion is a problem). Any suitable concentration of the higher molecular weight fraction of the melanoidin-containing product that effectively reduces corrosion in a chloride salt, brine, or a deicing formulation may be used. A typical concentration can vary from about 0.03 to 10.0% by weight. For example, one embodiment of a deicing formulation using the melanoidins of the present invention is as an additive to a known deicing and anti-icing formulation:

| | Weight % |
|---|---|
| Low Molecular Weight Carbohydrate | 3 to 60 |
| Inorganic Freezing Point Depressant | 5 to 35 |
| HMW Fraction of Melanoidin-Containing Product | 0.03 to 10.0 |
| Thickener | 0.15 to 10 (optional) |

The basic composition of the known deicing formulation consists of at least the first two of the following three components in aqueous solution depending upon ambient weather conditions, terrain, nature and amount of freezing/snow precipitation, and environmental concerns:

(1) Inorganic freezing point depressants preferably in the form of chloride salts which include magnesium chloride, calcium chloride and sodium chloride. Metal acetates e.g. calcium magnesium acetate, may also be used.

(2) Low molecular weight carbohydrates in the 180 to 1,500 range (180-1,000 preferred) wherein the carbohydrate is at least one selected from the group consisting of glucose, fructose and higher saccharides based on glucose and/or fructose and mixtures thereof. These carbohydrates can be obtained from a wide range of agricultural based products such as those derived from corn, wheat, barley, oats, sugar cane, sugar beets etc and products such as corn syrup and molasses.

(3) Thickeners are used in certain applications as the third key component to increase the viscosity of the composition so that the liquid remains in contact with the road surface or with the solid particles in piles of rocksalt/sand, or rocksalt/aggregates, or salt alone, or sand or aggregate. Thickeners are mainly cellulose derivatives or high molecular weight carbohydrates. Typical molecular weights for cellulose derivatives are for methyl and hydroxy propyl methyl celluloses from about 60,000 to 120,000 and for hydroxy ethyl celluloses from about 750,000 to 1,000,000. Carbohydrate molecular weights range from about 10,000 to 50,000.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of reducing the corrosion caused by a chloride salt, the method comprising the steps of:
    obtaining a molecular weight fraction of a product containing melanoidins, wherein the molecular weight fraction comprises melanoidins having a molecular weight greater than or equal to 12,400;
    forming an aqueous solution including the molecular weight fraction of a product containing melanoidins; and
    applying the solution to a metal surface, wherein the molecular weight fraction of a product containing melanoidins reduces corrosion at the metal surface caused by the chloride salt.

2. The method of claim 1, wherein the metal surface contains iron.

3. The method of claim 1, wherein the product containing melanoidins is selected from the group consisting of sugar cane and sugar beets.

4. The method of claim 1, wherein the product containing melanoidins is selected from the group consisting of molasses, corn steep liquor, brewers condensed solubles, and distillers condensed solubles.

5. The method of claim 1, wherein the metal surface is a roadway.

6. The method of claim 1, wherein the metal surface is an oil well surface.

7. The method of claim 1, wherein the chloride salt is at least one selected from the group consisting of sodium chloride, magnesium chloride, calcium chloride, and potassium chloride.

8. The method of claim 1, wherein the chloride salt is an industrial brine.

9. The method of claim 1, further comprising the step of adding a carbohydrate having a molecular weight in the range of 180 to 1500 to the solution, wherein said carbohydrate is at least one selected from the group consisting of glucose, fructose and higher saccharides based on glucose and/or fructose and mixtures thereof.

10. The method of claim 1, further comprising the step of adding a thickener selected from the group consisting of cellulose derivatives and carbohydrates in the range of 60,000 to 1,000,000 for cellulose derivatives and 10,000 to 50,000 for carbohydrates to the chloride salt.

11. An anticorrosive composition comprising:
    water;
    a chloride salt; and
    a molecular weight fraction of a product containing melanoidins, wherein melanoidins have a molecular weight greater than or equal to 12,400.

12. The anticorrosive composition of claim 11, wherein the product containing melanoidins is selected from the group consisting of sugar cane and sugar beets.

13. The anticorrosive composition of claim 11, wherein the product containing melanoidins is selected from the group consisting of molasses, corn steep liquor, brewers condensed solubles, and distillers condensed solubles.

14. The anticorrosive composition of claim 11, wherein the chloride salt is at least one selected from the group consisting of sodium chloride, magnesium chloride, calcium chloride, and potassium chloride.

15. The anticorrosive composition of claim 11, wherein the chloride salt is an industrial brine.

16. The anticorrosive composition of claim 11, further comprising a carbohydrate having a molecular weight in the range of 180 to 1500, wherein said carbohydrate is at least one selected from the group consisting of glucose, fructose and higher saccharides based on glucose and/or fructose and mixtures thereof.

17. The anticorrosive composition of claim 11, further comprising a thickener selected from the group consisting of cellulose derivatives and carbohydrates in the range of 60,000 to 1,000,000 for cellulose derivatives and 10,000 to 50,000 for carbohydrates to the chloride salt.

* * * * *